(12) United States Patent
Takami

(10) Patent No.: US 10,169,766 B2
(45) Date of Patent: Jan. 1, 2019

(54) SERVER APPARATUS, TERMINAL APPARATUS, USER'S DEGREE OF INTEREST CALCULATION METHOD, USER'S DEGREE OF INTEREST CALCULATION PROGRAM, TERMINAL PROGRAM, RECORDING MEDIUM HAVING PROGRAM RECORDED THEREIN, AND AN INFORMATION PROVIDING SYSTEM

(71) Applicant: Rakuten, Inc., Tokyo (JP)

(72) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 627 days.

(21) Appl. No.: 14/825,498

(22) Filed: Aug. 13, 2015

(65) Prior Publication Data
US 2015/0350294 A1    Dec. 3, 2015

Related U.S. Application Data

(62) Division of application No. 13/511,951, filed as application No. PCT/JP2010/070597 on Nov. 18, 2010, now Pat. No. 9,251,526.

(51) Int. Cl.
| | | |
|---|---|---|
| G06Q 30/02 | (2012.01) | |
| H04L 29/08 | (2006.01) | |
| G06F 3/0485 | (2013.01) | |

(52) U.S. Cl.
CPC .......... *G06Q 30/02* (2013.01); *G06F 3/0485* (2013.01); *G06Q 30/0201* (2013.01); *H04L 67/02* (2013.01); *H04L 67/22* (2013.01); *G06F 2213/0038* (2013.01)

(58) Field of Classification Search
CPC .............................. G06Q 30/02; G06F 3/0485
See application file for complete search history.

(56) References Cited

U.S. PATENT DOCUMENTS

| | | | |
|---|---|---|---|
| 6,515,690 B1 * | 2/2003 | Back ...................... | G09B 17/00 434/178 |
| 2006/0146719 A1 | 7/2006 | Sobek et al. | |
| 2007/0271519 A1 | 11/2007 | Hu et al. | |

(Continued)

FOREIGN PATENT DOCUMENTS

| | | |
|---|---|---|
| CN | 1983264 A | 6/2007 |
| JP | 2000-112978 A | 4/2000 |
| JP | 2001-51925 A | 2/2001 |

(Continued)

OTHER PUBLICATIONS

Yoshinori Hijikata, "User Profiling Technique for Information Recommendation and Information Filtering", Journal of the Japanese Society for Artificial Intelligence, May 1, 2004, pp. 365-372, vol. 19, No. 3.

(Continued)

*Primary Examiner* — Li P Sun
(74) *Attorney, Agent, or Firm* — Sughrue Mion, PLLC

(57) ABSTRACT

A server apparatus according to the invention obtains, from a terminal apparatus, scroll operation information conducted on a display area of the terminal apparatus, and obtains content identification information for identifying the content displayed at the display area, and calculates the user's degree of interest in the content identified by the obtained content identification information.

2 Claims, 6 Drawing Sheets

(56) References Cited

U.S. PATENT DOCUMENTS

2007/0276904 A1  11/2007  Satou
2008/0141126 A1* 6/2008  Johnson ................ G06F 17/212
                                                      715/273

FOREIGN PATENT DOCUMENTS

JP   2008-198171 A1   8/2008
WO   2009/116317 A1   9/2009

OTHER PUBLICATIONS

Extended European Search Report dated Sep. 5, 2013, issued in European Patent Application No. 10833129.9.
"Knowing the User's Every Move—User Activity Tracking for Website Usability Evaluation and Implicit Interaction," WWW '06 Proceedings of the 15$^{th}$ International Conference on World Wide Web, ACM, New York, NY, USA, May 22, 2006, pp. 203-212, XP002519605.
English language version of International Search Report for International Application No. PCT/JP2010/070597 dated Feb. 8, 2011.

* cited by examiner

FIG.3A
221
USER INFORMATION DB
- USER ID
- NAME
- GENDER
- ADDRESS
- TELEPHONE NUMBER
- EMAIL ADDRESS
- ......

FIG.3B
222
AUTHENTICATION INFORMATION DB
- USER ID
- LOGIN ID
- PASSWORD

FIG.3C
223
SITE INFORMATION DB
- SITE ID
- PAGE ID
- OBJECT ID

FIG.3D
224
OPERATION INFORMATION DB
- USER ID
- PAGE ID
- OBJECT ID
- SCROLL OPERATION SPEED
- SCROLL OPERATION SPEED_AVERAGE VALUE
- SCROLL OPERATION SPEED_MAXIMUM FREQUENCY
- SCROLL OPERATION SPEED_MAXIMUM VALUE
- SCROLL OPERATION SPEED_MINIMUM VALUE
- SCROLL OPERATION TIME
- PAGE-STAYING TIME

FIG.3E
225
DEGREE OF INTEREST INFORMATION DB
- USER ID
- PAGE ID
- DEGREE OF INTEREST IN A PAGE
- OBJECT ID
- DEGREE OF INTEREST IN AN OBJECT

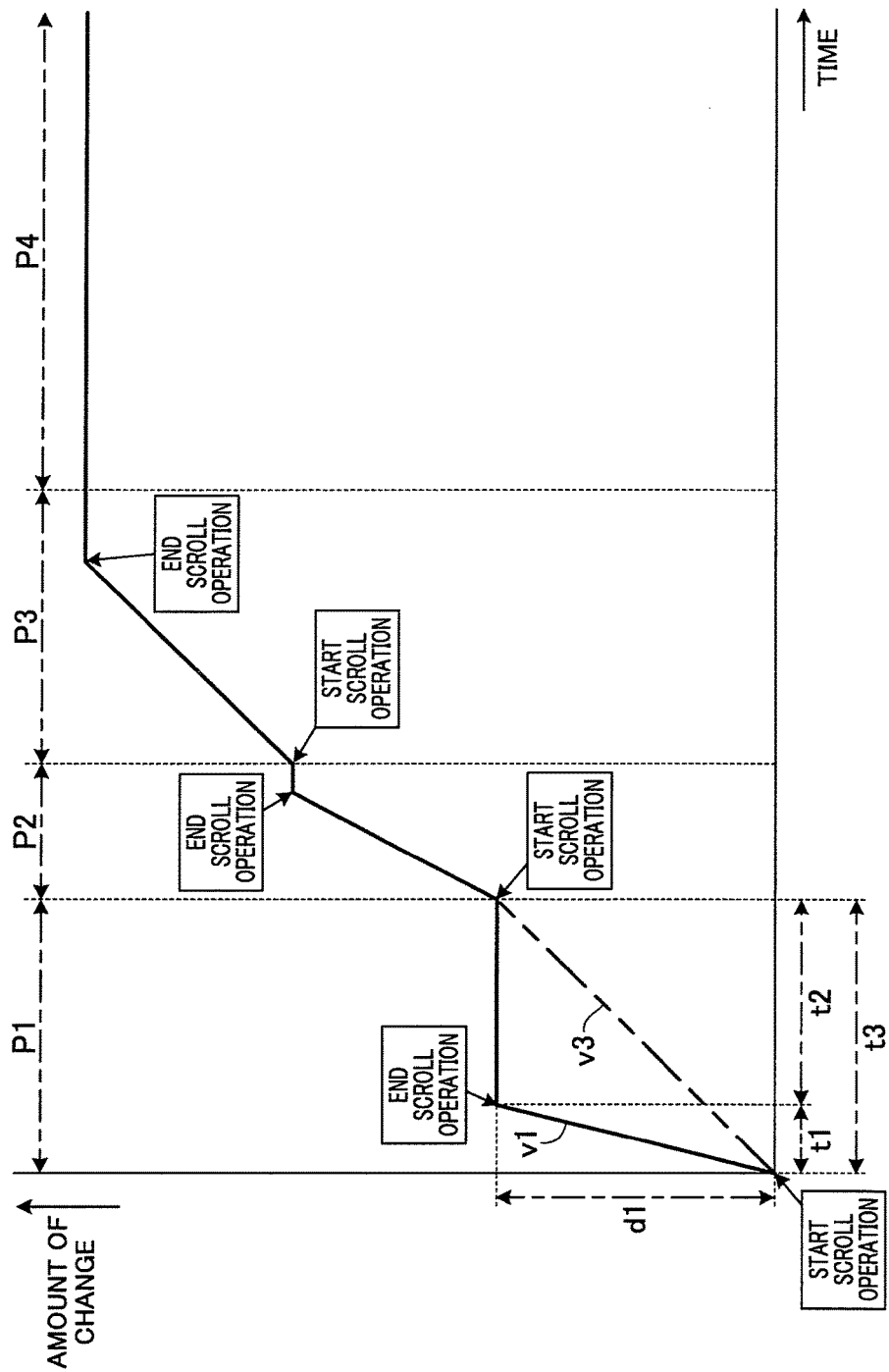

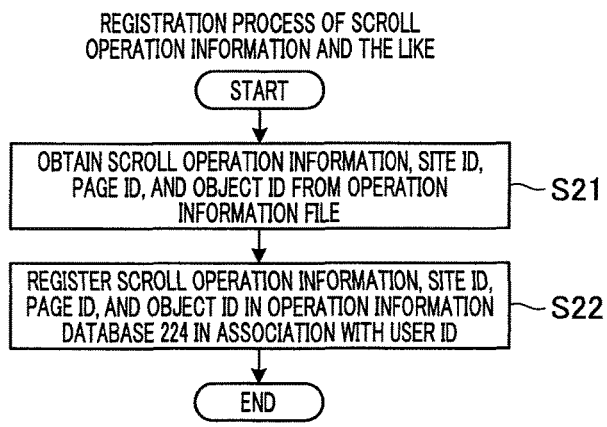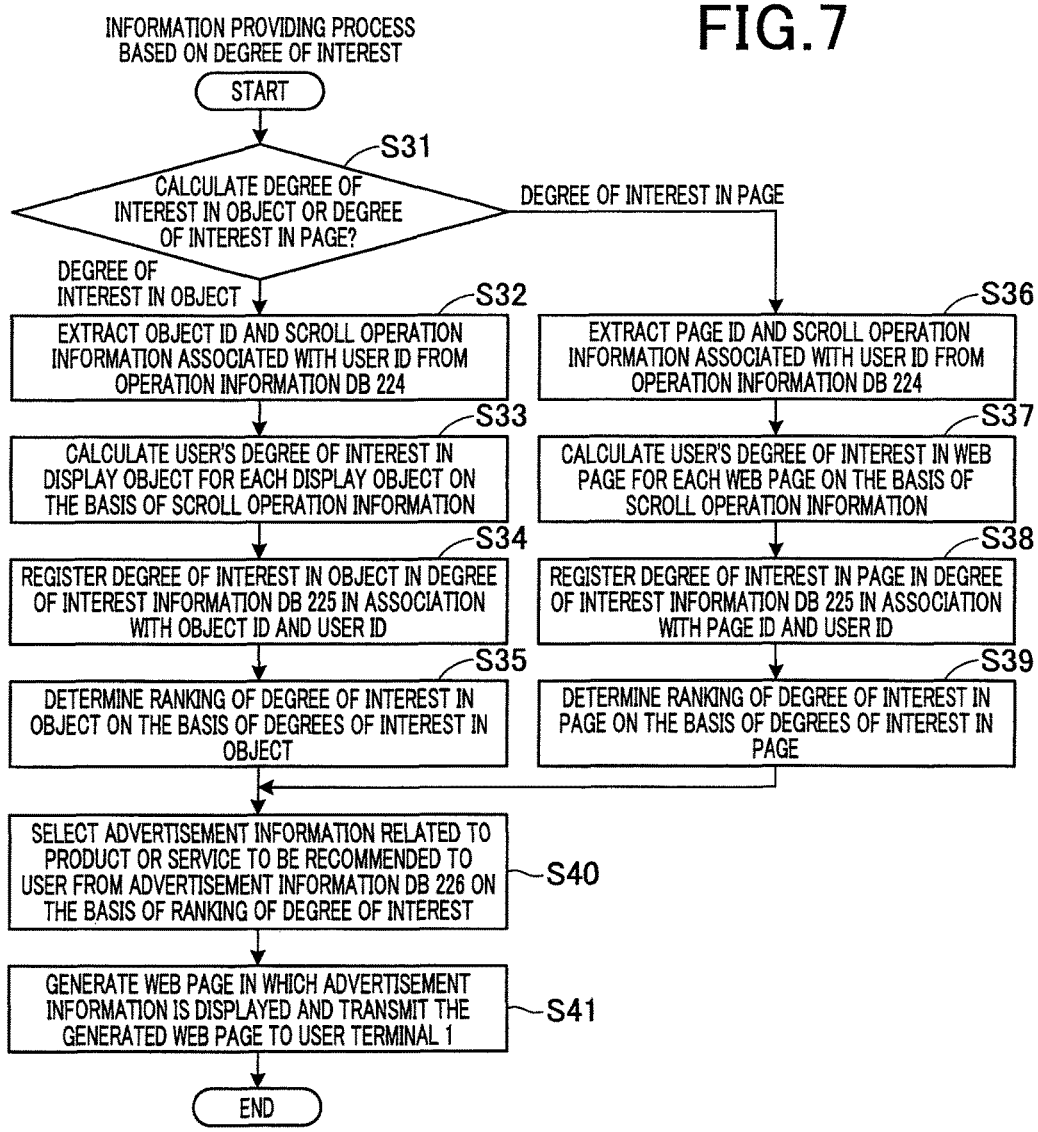

SERVER APPARATUS, TERMINAL APPARATUS, USER'S DEGREE OF INTEREST CALCULATION METHOD, USER'S DEGREE OF INTEREST CALCULATION PROGRAM, TERMINAL PROGRAM, RECORDING MEDIUM HAVING PROGRAM RECORDED THEREIN, AND AN INFORMATION PROVIDING SYSTEM

CROSS REFERENCE TO RELATED APPLICATIONS

This application is a Divisional of U.S. application Ser. No. 13/511,951, filed on May 24, 2012 in the United States Patent and Trademark Office, which is a National Stage of International Application No. PCT/JP2010/070597, filed on Nov. 18, 2010, which claims priority from Japanese Patent Application No. 2009-268801, filed on Nov. 26, 2009, the contents of all of which are incorporated herein by reference in their entirety.

TECHNICAL FIELD

The present invention relates to a technical field for determining a degree of interest in a web page provided from a website on the Internet.

BACKGROUND ART

There are a large number of websites on the Internet and these websites publish a wide variety of information. A user terminal connected to the Internet accesses a website by specifying a URL (Uniform Resource Locator) of the website by a web browser, so that the user terminal can display a web page provided from the website. Thereby, a user of the user terminal can browse information posted on a web page provided from the website. Therefore, it is important for a provider of the information posted on the webpage to know the level of interest of the user (degree of interest) in the web page and the information posted thereon.

Conventionally, the user's degree of interest is determined on the basis of the browsing time of the web page (staying time in the web page). In this method, the longer the browsing time of the web page, the higher the user's degree of interest is determined to be. For example, Patent Document 1 discloses a technique for measuring an elapsed time by using transition of a web page as an end event and transmitting the elapsed time to a server as the browsing time of each web page.

CITATION LIST

Patent Document

Patent Document 1: Japanese Patent Application Laid-Open No. 2001-51925

SUMMARY OF THE INVENTION

Problems to be Solved by the Invention

However, like the technique disclosed in Patent Document 1 described above, the method that determines the user's degree of interest on the basis of the browsing time of the web page cannot distinguish between a time period in which the user does not browse the web page (unattended time) and a time period in which the user actually browses the web page, so that these time periods are collectively assumed to be the browsing time. Therefore, a problem related to a determination accuracy of the user's degree of interest in the web page is not solved.

The present invention is made in view of the above problem and an example of the object of the present invention is to provide a server apparatus, a terminal apparatus, a user's degree of interest calculation method, a user's degree of interest calculation program, a terminal program, a recording medium having a program recorded therein, and an information providing system, which are capable of improving accuracy of the user's degree of interest in a web page or the like.

Means for Solving the Problem

In order to achieve the above object, a server apparatus described in claim 1 is accessible from a terminal apparatus via a network, the server apparatus comprising: an information obtaining means that obtains scroll operation information of a display area of the terminal apparatus and contents identification information for identifying contents displayed in the display area from the terminal apparatus; and a degree of interest calculation means that calculates a user's degree of interest in contents identified by the obtained contents identification information on the basis of the obtained scroll operation information.

According to this invention, the user's degree of interest in displayed contents is calculated on the basis of the scroll operation information related to a scroll when the contents is scrolled according to a scroll operation of the user, so that it is possible to improve the accuracy of the user's degree of interest in the contents and appropriately evaluate the degree of interest.

The server apparatus described in claim 2 according to claim 1, further comprising: a storage means that stores the scroll operation information and the contents identification information in association with each other; and an extraction means that extracts the scroll operation information and the contents identification information from the storage means.

The server apparatus described in claim 3 according to claim 2, wherein the storage means stores the scroll operation information and the contents identification information which correspond to each of a plurality of contents, the degree of interest calculation means calculates the degree of interest for each content, and the server apparatus further comprises a ranking determination means that determines ranking of degree of interest on the basis of the calculated degrees of interest.

According to this invention, it is possible to provide a highly accurate ranking of the user's degree of interest to a provider of the contents or the like.

The server apparatus described in claim 4 according to any one of claims 1 to 3, further comprising: an information selection means that selects information to be provided to the user on the basis of the calculated degrees of interest; and an information transmission means that transmits the selected information to the terminal apparatus.

According to this invention, it is possible to present information more suited to the preference of the user to the user and recommend a product or a service more effectively.

The server apparatus described in claim 5 according to any one of claims 1 to 4, wherein a scroll operation speed is indicated in the scroll operation information, and the degree of interest calculation means calculates the degree of interest so that the slower the scroll operation speed indicated in the scroll operation information, the larger the degree of interest.

According to this invention, the height of the degree of interest is determined by the fast speed or the slow speed of the scroll operation by the user, so that it is possible to determine a highly accurate degree of interest during a scroll operation as a normal operation while the user is unaware.

The server apparatus described in claim 6 according to any one of claims 1 to 4, wherein a scroll operation time is indicated in the scroll operation information, and the degree of interest calculation means calculates the degree of interest so that the longer the scroll operation time indicated in the scroll operation information, the larger the degree of interest.

According to this invention, the height of the degree of interest is determined by the length of the scroll operation time by the user, so that it is possible to determine a highly accurate degree of interest during a normal scroll operation while the user is unaware.

The server apparatus described in claim 7 according to any one of claims 1 to 4, wherein a scroll operation speed is indicated in the scroll operation information, and the degree of interest calculation means calculates the degree of interest so that the higher the frequency of changes in the scroll operation speed indicated in the scroll operation information, the larger the degree of interest.

According to this invention, even when the user repeatedly speeds up and down the scroll, a highly accurate degree of interest can be calculated.

The server apparatus described in claim 8 according to any one of claims 1 to 7, wherein the information obtaining means obtains screen size information indicating a screen size of the terminal apparatus from the terminal apparatus along with the scroll operation information and the contents identification information, a storage means stores the obtained scroll operation information, the contents identification information, and the screen size information in association with each other, and when the degree of interest calculation means extracts the scroll operation information, the contents identification information, and the screen size information from the storage means and calculates the degree of interest on the basis of the extracted scroll operation information, the degree of interest calculation means adjusts the degree of interest by weighting the degree of interest according to the screen size indicated in the extracted screen size information.

According to this invention, even when one user uses a terminal apparatus whose screen size is large and a terminal apparatus whose screen size is small, the degrees of interest calculated by using the scroll operation information respectively obtained from each user terminal apparatus can be used in common.

The server apparatus described in claim 9 according to any one of claims 1 to 7, wherein the information obtaining means obtains displayed character size information indicating a displayed character size in contents displayed on the terminal apparatus from the terminal apparatus along with the scroll operation information and the contents identification information, a storage means stores the obtained scroll operation information, the contents identification information, and the displayed character size information in association with each other, and when the degree of interest calculation means extracts the scroll operation information, the contents identification information, and the screen size information from the storage means and calculates the degree of interest on the basis of the extracted scroll operation information, the degree of interest calculation means adjusts the degree of interest by weighting the degree of interest according to the displayed character size indicated in the extracted displayed character size information.

According to this invention, even when one user uses a terminal apparatus in which the displayed character size is large and a terminal apparatus in which the displayed character size is small, the degrees of interest calculated by using the scroll operation information respectively obtained from each user terminal apparatus can be used in common.

The server apparatus described in claim 10 according to any one of claims 1 to 9, wherein a scroll operation speed is indicated in the scroll operation information, and the scroll operation speed is calculated by dividing an amount of scroll of the contents by a time period from when a scroll operation is started to when the next scroll operation is started.

According to this invention, even when the user performs a scroll operation in which the user quickly scrolls the web page, temporarily stops the scroll operation, thoroughly browses the contents, and scrolls the contents again, it is possible to determine an appropriate user's degree of interest.

The server apparatus described in claim 11 according to anyone of claims 1 to 10, wherein the contents comprise at least one of a moving image, a still image, and a text displayed on a web page displayed on the terminal apparatus.

A user's degree of interest calculation method in a server apparatus described in claim 12 which is accessible from a terminal apparatus via a network, the method comprising: a step of obtaining scroll operation information of a display area of the terminal apparatus and contents identification information for identifying contents displayed in the display area from the terminal apparatus; and a step of calculating a user's degree of interest in contents identified by the obtained contents identification information on the basis of the obtained scroll operation information.

A user's degree of interest calculation program described in claim 13 causing a computer, which is accessible from a terminal apparatus via a network, to function as: an information obtaining means that obtains scroll operation information of a display area of the terminal apparatus and contents identification information for identifying contents displayed in the display area from the terminal apparatus, and a degree of interest calculation means that calculates a user's degree of interest in contents identified by the obtained contents identification information on the basis of the obtained scroll operation information.

A recording medium described in claim 14 that records a user's degree of interest calculation program causing a computer, which is accessible from a terminal apparatus via a network, to function as: an information obtaining means that obtains scroll operation information of a display area of the terminal apparatus and contents identification information for identifying contents displayed in the display area from the terminal apparatus, and a degree of interest calculation means that calculates a user's degree of interest in contents identified by the obtained contents identification information on the basis of the obtained scroll operation information.

A terminal apparatus described in claim 15 comprising: an information obtaining means that obtains scroll operation information of a display area of a terminal apparatus and contents identification information for identifying contents displayed in the display area; and a degree of interest calculation means that calculates a user's degree of interest in contents identified by the obtained contents identification information on the basis of the obtained scroll operation information.

A terminal program described in claim 16 causing a computer to function as: an information obtaining means that obtains scroll operation information of a display area of a terminal apparatus and contents identification information for identifying contents displayed in the display area, and a degree of interest calculation means that calculates a user's degree of interest in contents identified by the obtained contents identification information on the basis of the obtained scroll operation information.

A recording medium described in claim 17 that records a terminal program causing a computer to function as: an information obtaining means that obtains scroll operation information of a display area of a terminal apparatus and contents identification information for identifying contents displayed in the display area, and a degree of interest calculation means that calculates a user's degree of interest in contents identified by the obtained contents identification information on the basis of the obtained scroll operation information.

An information providing system described in claim 18 comprising a terminal apparatus and a server apparatus which is accessible from the terminal apparatus via a network, wherein the terminal apparatus comprises an obtaining means that obtains scroll operation information of a display area of the terminal apparatus, and a transmission means that transmits the obtained scroll operation information and contents identification information for identifying contents displayed in the display area, and the server apparatus comprises a reception means that receives the scroll operation information and the contents identification information transmitted from the terminal apparatus, and a degree of interest calculation means that calculates a user's degree of interest in contents identified by the received contents identification information on the basis of the received scroll operation information.

Effect of the Invention

According to the present invention, the user's degree of interest in displayed contents is calculated on the basis of the scroll operation information related to a scroll when the contents is scrolled according to a scroll operation of the user, so that it is possible to improve the accuracy of the user's degree of interest in the contents and appropriately evaluate the degree of interest.

BRIEF DESCRIPTION OF THE DRAWINGS

FIG. 3A is a diagram showing a configuration example of information registered in user information database.

FIG. 3B is a diagram showing a configuration example of information registered in authentication information database.

FIG. 3C is a diagram showing a configuration example of information registered in site information database.

FIG. 3D is a diagram showing a configuration example of information registered in operation information database.

FIG. 3E is a diagram showing a configuration example of information registered in degree of interest information database.

FIG. 5 is a conceptual diagram showing an example of a relationship between an amount of change of web page and a scroll operation time.

FIG. 6 is a flowchart showing a registration process of scroll operation information and the like in a system control unit 24 of the information providing server 2.

FIG. 7 is a flowchart showing an information providing process based on a degree of interest in the system control unit 24 of the information providing server 2.

MODES FOR CARRYING OUT THE INVENTION

Hereinafter, an embodiment of the present invention will be described with reference to the drawings. The embodiment described below is an embodiment in a case in which the present invention is applied to an information providing system.

[1. Outline of a Configuration and Functions of the Information Providing System]

Figure 1:
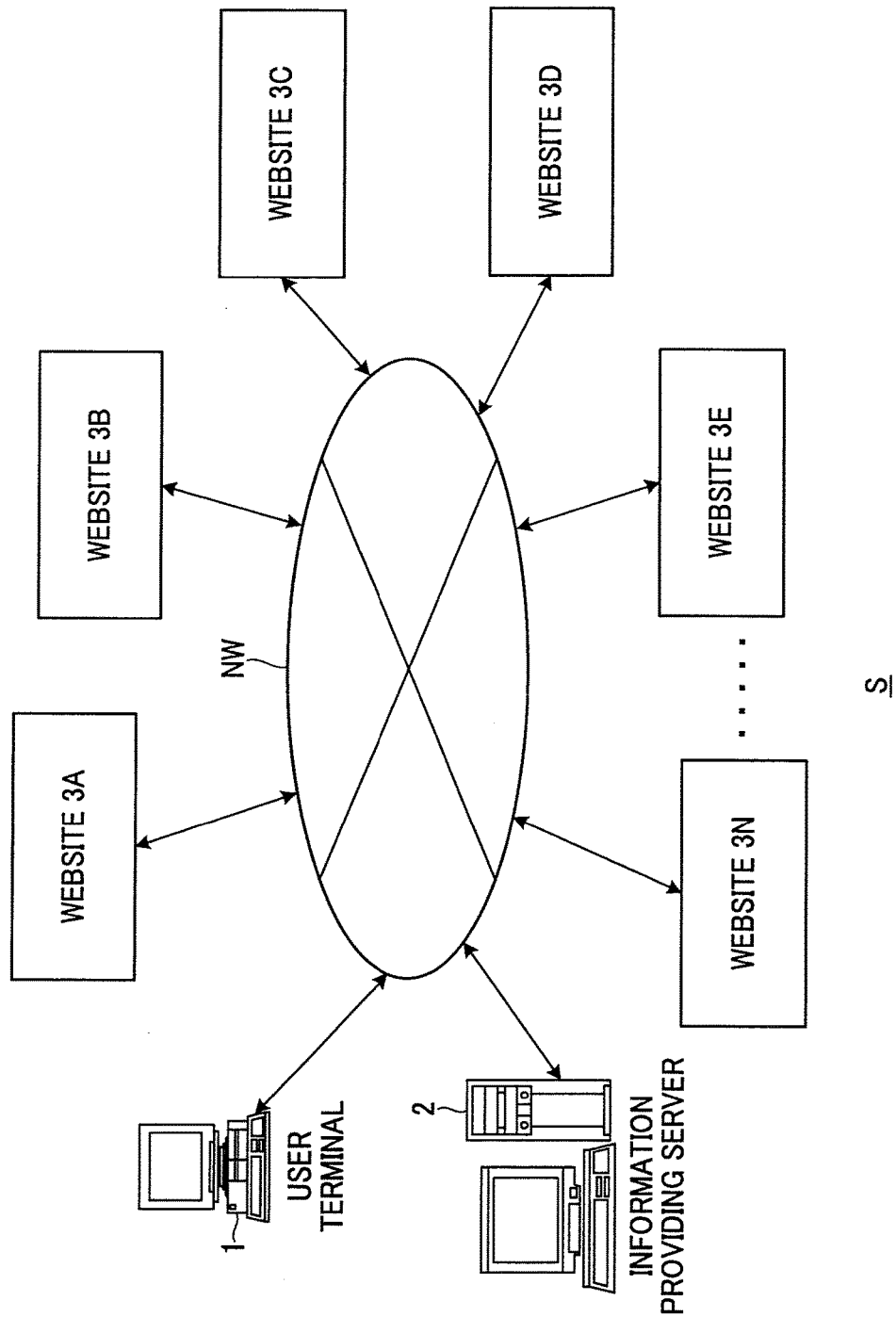
FIG. 1 is a diagram showing an example of a schematic configuration of an information providing system S according to an embodiment.

First, an outline of a configuration and functions of an information providing system S according to an embodiment of the present invention will be described with reference to FIG. 1. FIG. 1 is a diagram showing an example of a schematic configuration of the information providing system S according to the embodiment. As shown in FIG. 1, the information providing system S includes a user terminal 1 (an example of a terminal apparatus), an information providing server 2 (an example of a server apparatus), and a plurality of websites 3$k$ (k=any one of A, B, . . . , N). Although only one user terminal 1 is shown in FIG. 1 for convenience of description, there are many user terminals 1 used by each user.

The user terminal 1 and the information providing server 2 or the website 3$k$ can transmit and receive data to and from each other via a network NW by using, for example, TCP/IP as a communication protocol. The network NW is made up of, for example, the Internet, a dedicated communication line (for example, CATV (Community Antenna Television) line), a mobile communication network (including a base station and the like), gateways, and the like.

Each website 3$k$ includes a web server to which a unique domain name is given. Each website 3$k$ is also given a unique site ID. For example, the site ID may be URL or a domain name of the website 3$k$. A plurality of web pages are registered in each website 3$k$. These web pages are made up of, for example, structured document files such as HTML (Hyper Text Markup Language) or XML (Extensible Markup Language) files, image data, and the like. These web pages are examples of contents on which the user's degree of interest is calculated. Each web page is given a unique page ID. This page ID is an example of contents identification information (web page identification information) for identifying the web page as contents. For example, the page ID may be URL of the web page.

A display object that includes at least one of a moving image, a still image, and a text displayed on a web page is also an example of contents. This display object can be identified by, for example, ID or URI (for example, file name) in a tag described in an HTML document, display position information (coordinates of a plurality of points of the display object after rendering) of the display object in an active display area, or the like. Hereinafter, the information for identifying the display object is referred to as an object ID (an example of the contents identification information).

The user terminal 1 is, for example, a personal computer (PC), a PDA (Personal Digital Assistant), a mobile phone, or a portable game machine, and has a web browser function. The user terminal 1 accesses a website 3*k* and obtains a web page by a web browser, and then displays (renders) the web page in a window screen appearing on the display. Thereby, a user can browse the web page provided from the website 3*k*. The window screen is an active display area in the web browser. The active display area is the entire screen in a full-screen display mode.

When a part of display area of the web page cannot be accommodated in the window screen appearing on the display of the user terminal 1, the user terminal 1 scrolls the web page (that is, a display area in which texts and images are displayed) in the horizontal direction, the vertical direction, or an oblique direction in the window screen (the user terminal 1 moves the web page in the active display area in the web browser) according to a scroll operation of the user. The scroll is performed from when the user starts the scroll operation to when the user completes the scroll operation. Here, examples of the scroll operation by a user include that the user rotates a wheel (a button between the left and right buttons) of a mouse (an operation unit of the user terminal 1), the user moves a scroll bar displayed near the window screen by a drag function of the mouse, the user presses an up, down, left, or right key of a keyboard (an operation unit of the user terminal 1), the user drags the window screen and moves the active display area in an arbitrary direction by using a pointing device such as the mouse, the user flicks (for example, lightly flicks with a finger) on a touch panel window screen and the like.

The web browser of the user terminal 1 obtains scroll operation information related to the scroll (an example of scroll operation information of the display area) when the web page scrolls according to the scroll operation. Next, the web browser of the user terminal 1 creates an operation information file which includes the obtained scroll operation information, the page ID of the web page, the site ID of the website 3*k* that provides the web page, and the object ID of the display object displayed in the window screen when the web page scrolls. The web browser of the user terminal 1 transmits the created operation information file and the user ID stored in the user terminal 1 to the information providing server 2 via the network NW.

In the web browser, a program is installed which creates the operation information file by obtaining the scroll operation information and transmits the operation information file to the information providing server 2 (for example, the program is plug-in software to expand the functions of the browser). In the program, information such as an IP address or the like necessary to access the information providing server 2 and information such as transmission timing of the operation information file or the like are specified. This transmission timing of the operation information file is, for example, when the scroll operation for performing the scroll from which the scroll operation information is obtained is completed. If the start of scroll and the end of scroll are repeatedly performed while a web page is displayed, every time the above operation is performed, the operation information file and the user ID are transmitted to the information providing server 2. The scroll operation information stored in the operation information file includes, for example, a scroll operation speed, a scroll operation time and the like.

The scroll operation speed, the scroll operation time and the like are used to determine the user's degree of interest in the web page and the display object.

Here, the scroll operation speed is a speed at which the web page scrolls. For example, the scroll operation speed is detected (calculated) by dividing the amount of change of the web page changing (moving) in the window screen by the scroll operation time related to the change (movement) of the web page. The above-mentioned "amount of change" corresponds to, for example, a distance between a first coordinates (x1, y1) and a second coordinates (x2, y2) on a screen when a certain pixel (or pixels) on the web page displayed in the window screen moves from the first coordinates to the second coordinates. The above-mentioned "scroll operation time" is, for example, a time period in which the web page scrolls (that is, a time period from when the scroll operation is started to when the scroll operation is ended) (the time is calculated by a time-measuring program).

The web browser of the user terminal 1 calculates a time period from when the display of the web page is started to when the display of the web page is ended (hereinafter referred to as "page-staying time") and transmits the operation information file and the user ID to the information providing server 2 via the network NW, the operation information file includes the page ID of the web page, the site ID of the website 3*k* that provides the web page, and information indicating the page-staying time. Here, the display of the web page is ended by a user operation, such as, for example, selecting a hyper link (clicking the hyper link using the mouse) or pressing the return button of the web browser or the close button of the web browser.

[2. Configuration and Function of the Information Providing Server 2]

Figure 2:
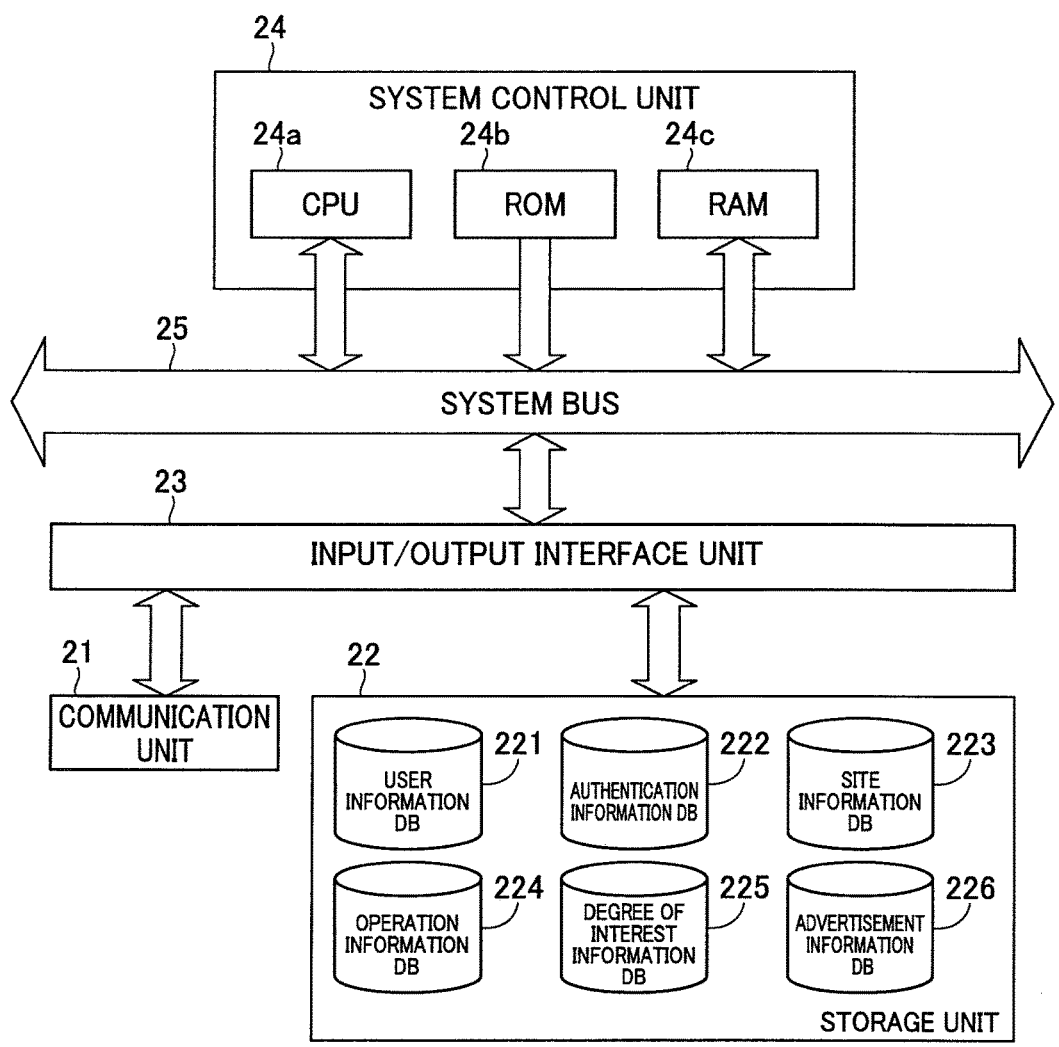
FIG. 2 is a block diagram showing an example of a schematic configuration of an information providing server 2 according to the embodiment.

Next, the configuration and the functions of the information providing server 2 will be described with reference to FIG. 2. FIG. 2 is a block diagram showing an example of a schematic configuration of the information providing server 2 according to the embodiment.

As shown in FIG. 2, the information providing server 2 includes a communication unit 21, a storage unit 22, an input/output interface unit 23, and a system control unit 24. The system control unit 24 and the input/output interface unit 23 are connected to each other via a system bus 25.

The communication unit 21 connects to the network NW and controls a state of communication with the user terminal 1.

The storage unit 22 is made up of, for example, a hard disk drive, and stores various programs such as the operating system, the user's degree of interest calculation program and the like. For example, the user's degree of interest calculation program of the present invention may be obtained (downloaded) from another server or the like via the network NW or may be stored in a recording medium such as a CD (Compact Disc) or a DVD (Digital Versatile Disc) and read via a drive apparatus.

The storage unit 22 (an example of a storage means) stores data (for example, HTML file, image data, and the like) for forming a web page to be provided to the user terminal 1.

In the storage unit 22, a user information database (DB) 221, an authentication information database (DB) 222, a site information database (DB) 223, an operation information database (DB) 224, a degree-of-interest information database (DB) 225, and an advertisement information database (DB) 226 are formed.

FIG. 3 is a diagram showing a configuration example of the information registered in each database.

In the user information database 221 shown in FIG. 3A, user information such as user ID, name, gender, address, telephone number, and email address of users registered as members is associated with each user and registered.

In the authentication information database 222 shown in FIG. 3B, user ID, login ID, and password are associated with each user and registered. The login ID and the password are authentication information used for a login process (user authentication process).

In the site information database 223 shown in FIG. 3C, site ID, page ID, and object ID are associated with each site and registered. Normally, a plurality of web pages are registered in one website, so that, in the site information database 223, a plurality of page IDs are associated with one site ID and registered. Further, normally, a plurality of display objects are displayed in one web page, so that, a plurality of object IDs are associated with one web page and registered.

Although not shown in FIG. 3, in the site information database 223, information related to web page (for example, an abstraction of text displayed on the web page, image, category (for example, shopping, travel, and the like), and the like) is associated with page ID for each web page and registered. Further, in the site information database 223, information related to display object (for example, a category, a product type (service type), and the like displayed in the display object) is associated with object ID for each display object and registered.

In the operation information database 224 shown in FIG. 3D, user ID, page ID, object ID, scroll operation speeds (for a plurality of times), scroll operation speed_average value, scroll operation speed_maximum frequency, scroll operation speed_maximum value, scroll operation speed_minimum value, scroll operation time, and the page-staying time are associated with each user and registered. That is, in the operation information database 224, the page IDs of a plurality of web pages are respectively associated with scroll operation information, the plurality of web pages are browsed by the user of the user terminal 1 in a plurality of websites 3k, and the scroll operation information regards cases in which the user browses the web pages. Usually, the scroll operation speed is detected multiple times when one web page is displayed, so that a plurality of scroll operation speeds are registered, and each scroll operation speed is associated with the object ID of the display object displayed when the scroll is performed.

Here, the scroll operation speed_average value is an average value of the scroll operation speeds, which are detected multiple times. The scroll operation speed_maximum frequency is a scroll operation speed which appears most frequently among the scroll operation speeds which are detected multiple times. The scroll operation speed_maximum value is the maximum value of the scroll operation speeds which are detected multiple times. The scroll operation speed_minimum value is the minimum value of the scroll operation speeds which are detected multiple times. The scroll operation speed_average value, the scroll operation speed_maximum frequency, the scroll operation speed_maximum value, and the scroll operation speed_minimum value may be calculated by the user terminal 1 and included in the scroll operation information or may be calculated by the system control unit 24 of the information providing server 2.

In the degree-of-interest information database 225 shown in FIG. 3E, user ID, page ID, degree of interest in a page, object ID, and degree of interest in an object are associated with each user and registered.

Here, the degree of interest in a page indicates a user's degree of interest in a web page identified by the page ID. The degree of interest in a page is registered for each web page. The degree of interest in an object indicates a user's degree of interest in a display object identified by the object ID. The degree of interest in an object is registered for each display object. In the description below, "degree of interest" means the degree of interest in a page or the degree of interest in an object.

Although FIG. 3 does not show a configuration example of the advertisement information database 226, a plurality of advertisement information related to products and services to be recommended to the user of the user terminal 1 are registered in the advertisement information database 226. Information such as a category, a product type (or a service type) and the like are given to each of the advertisement information. In addition to the advertisement information database, the storage unit 22 stores a recommendation information database in which recommendation information to be provided to a user is registered or a contents material database in which contents materials constituting contents information (for example, advertisement information, recommendation information or the like) to be provided to a user is registered. The input/output interface unit 23 performs an interface process between the communication unit 21 and the storage unit 22, and the system control unit 24.

The system control unit 24 includes a CPU (Central Processing Unit) 24a, a ROM (Read Only Memory) 24b, a RAM (Random Access Memory) 24c, and the like. The CPU 24a reads and executes various programs stored in the ROM 24b and the storage unit 22, so that the system control unit 24 performs a process for providing a web page and the like.

Further, the system control unit 24 functions as an information obtaining means, a degree of interest calculation means, a ranking determination means, an information selection means, and an information transmission means of the present invention.

Specifically, the system control unit 24 obtains the operation information file and the user ID transmitted from the user terminal 1 and registers (stores) the scroll operation information, the site ID, the page ID, and the object ID included in the operation information file in the operation information database 224 in association with the user ID. At this time, if the scroll operation speed_average value, the scroll operation speed_maximum frequency, the scroll operation speed_maximum value, and the scroll operation speed_minimum value are not included in the operation information file, the system control unit 24 calculates these scroll operation speeds and registers the scroll operation speeds in the operation information database 224.

The system control unit 24 extracts scroll operation information, page ID, and object ID associated with a user ID of a certain user from the operation information database 224 and determines (calculates) the user's degree of interest in a display object identified by the extracted object ID for each display object on the basis of the extracted scroll operation information. Further, the system control unit 24 determines (calculates) the user's degree of interest in a web page identified by the extracted page ID for each web page. The degree of interest in an object and the degree of interest in a page are represented by, for example, a score (a numerical value), and it may be determined that the larger the score, the higher the degree of interest (that is, being interested in), and the lower the score, the lower the degree of interest (that is, not being interested in).

For example, the system control unit 24 calculates the degree of interest so that the slower the "scroll operation speed", the larger the degree of interest. In this case, for example, the degree of interest is calculated by the calculation formula: Sc (degree of interest)=α (arbitrary coefficient)/v (scroll operation speed). In this formula, α>0 and v>0.

For example, the system control unit 24 may be configured to calculate the degree of interest so that the smaller the "scroll operation speed/page-staying time", the larger the degree of interest. In this case, for example, the degree of interest is calculated by the calculation formula: Sc (degree of interest)=α (arbitrary coefficient)/(v (scroll operation speed)/Tt (page-staying time)). In this formula, (v/Tt)>0. In this calculation formula, the scroll operation time may be used instead of the page-staying time.

It can be said that the higher the frequency of changes in the scroll operation speed (the more the acceleration changes), the higher the degree of interest, because the user repeatedly speeds up and down the scroll. Therefore, the system control unit 24 may be configured to calculate the degree of interest so that the higher the frequency of changes in the scroll operation speed, the larger the degree of interest. In this case, for example, the degree of interest is calculated by the calculation formula: Sc (degree of interest)=α (arbitrary coefficient)×m (frequency of changes in the scroll operation speed). Here, for example, the frequency of changes in the scroll operation speed can be obtained by calculating the number of absolute values of differences between two scroll operation speeds adjacent to each other in the time series, which are larger than a threshold value, among a plurality of (for example, 10) scroll operation speeds of the scroll operation speeds detected multiple times.

When calculating the degree of interest in a page by using the scroll operation speed as described above, any one of the scroll operation speed_average value, the scroll operation speed_maximum frequency, the scroll operation speed_maximum value, and the scroll operation speed_minimum value is used. When an object ID is associated with a plurality of scroll operation speeds and registered, the degree of interest in the object is calculated by using any one of the average value, the maximum frequency, the maximum value, and the minimum value of these scroll operation speeds.

Although, in the above example, the degree of interest is calculated on the basis of the scroll operation speeds, as another example, the degree of interest may be calculated on the basis of the sum (total) of the scroll operation times from when the display of the web page is started to when the display of the web page is ended. If the scroll of the web page is temporarily stopped and then the scroll is restarted, the sum of the scroll operation times is the sum of the scroll times excluding the time in which the scroll is stopped. For example, the system control unit 24 calculates the degree of interest so that the longer the scroll operation time (the sum of the scroll operation times), the larger the degree of interest. In this case, for example, the degree of interest is calculated by the calculation formula: Sc (degree of interest) =α (arbitrary coefficient)×t (scroll operation time (the sum of the scroll operation times)).

The degree of interest in a page may be calculated by summing up the degrees of interest in all the display objects displayed on a corresponding web page.

The degree of interest in an object calculated as described above is associated with the object ID of the corresponding display object and the user ID and registered in the degree-of-interest information database 225. The calculated degree of interest in a page is associated with the page ID of the corresponding web page and the user ID, and registered in the degree-of-interest information database 225.

Then, the system control unit 24 determines ranking of the degree of interest in a page on the basis of all (or a predetermined number of) the degrees of interest in pages associated with the user ID of a certain user in the degree-of-interest information database 225.

Further, the system control unit 24 determines ranking of the degree of interest in an object on the basis of all (or a predetermined number of) the degrees of interest in objects associated with the user ID of a certain user in the degree-of-interest information database 225.

Data showing the ranking of the degree of interest determined as described above is provided, for example, to a website administrator and the like.

The system control unit 24 selects advertisement information (an example of information to be provided to the user) of a product or a service to be recommended to a certain user from the advertisement information database 226 on the basis of the degrees of interest in pages or the degrees of interest in objects associated with the user ID of the user in the degree-of-interest information database 225, and transmits the selected advertisement information to the user terminal 1 when the user logs in (or when the user terminal 1 accesses a specific site).

The system control unit 24 may be configured to select recommendation information to be provided to the user from the recommendation information database on the basis of the above-described degrees of interest and transmit the selected recommendation information to the user terminal 1. For example, recommendation information associated with information such as a keyword obtained from a web page or a display object whose degree of interest is higher than a reference value is selected.

Further, the system control unit 24 may be configured to determine the type of contents material in which the user is highly interested on the basis of the above-described degrees of interest, select contents material constituting the contents information to be provided to the user from the contents material database on the basis of the determination, and transmit the contents information constituted by the selected contents material to the user terminal 1. Here, the types of the contents material include, for example, text, still image, and moving image. For example, the type of contents material of a display object whose degree of interest is higher than a reference value is determined to be the type of contents material in which the user is highly interested, and the contents information such as the advertisement information or the recommendation information constituted by the type of contents material is transmitted to the user terminal 1.

[3. Operation of the Information Providing System]

Next, an operation of the information providing system S according to the embodiment will be described.

(3.1. Creation and Transmission of Operation Information File)

First, the process for creating and transmitting the operation information file by the user terminal 1 will be described with reference to FIG. 4.

Figure 4:
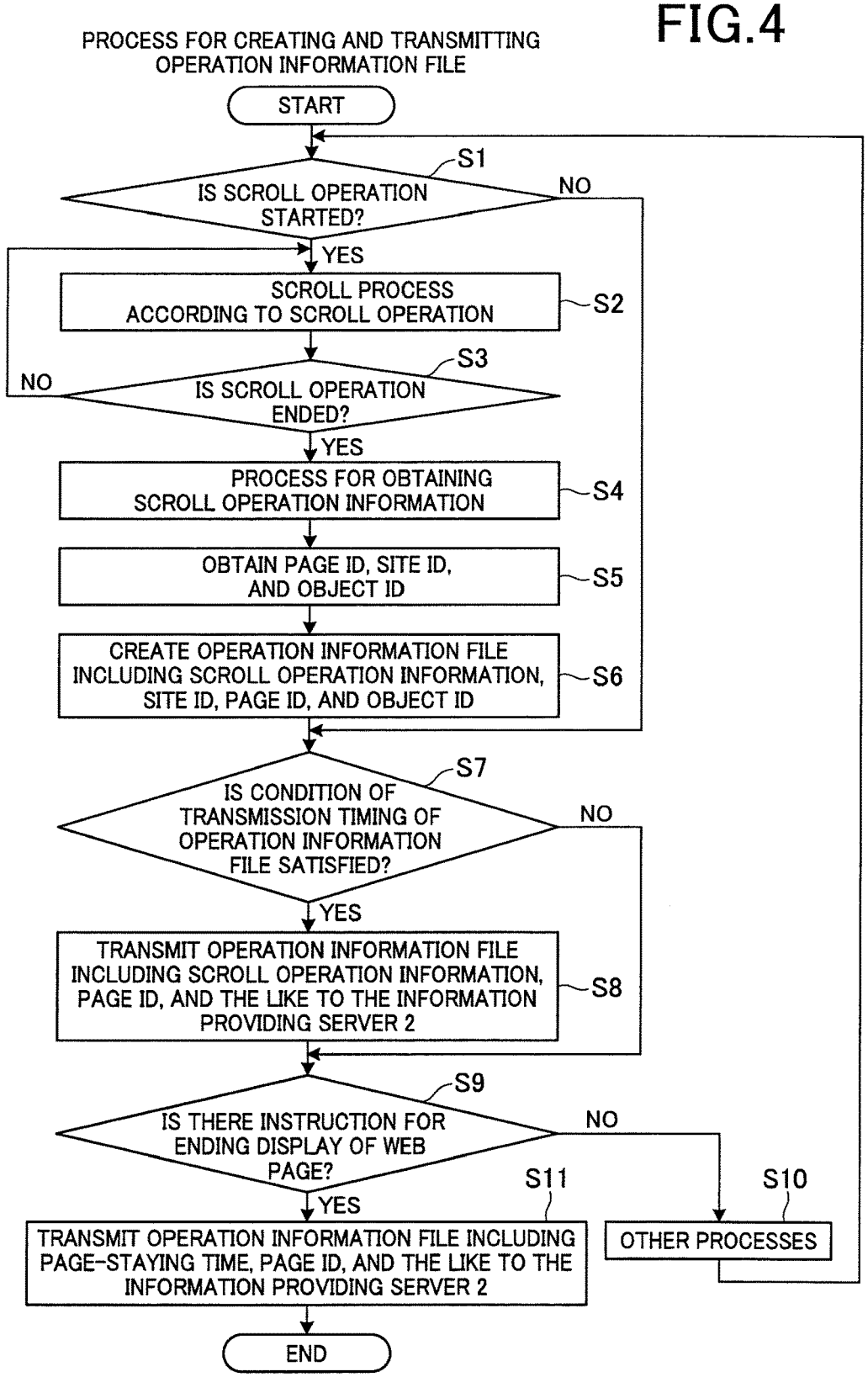
FIG. 4 is a flowchart showing a process of creating and transmitting an operation information file in a user terminal 1.

FIG. 4 is a flowchart showing the process of creating and transmitting the operation information file in the user terminal 1. The process shown in FIG. 4 is started, for example, when a web page transmitted from the website 3A as a response to an access request (for example, an HTTP (Hyper Text Transfer Protocol) request) to the website 3A from the user terminal 1 is received and displayed by the user terminal 1 after a web browser is started in the user terminal 1. The web page is added a page ID of the web page and a site ID of the website 3A.

When the process shown in FIG. 4 is started, the web browser of the user terminal 1 determines whether or not a scroll operation is started by a user on the basis of an operation signal caused by the scroll operation from the operation unit (step 1). If the web browser determines that the scroll operation is started (step S1: YES), the web browser starts counting of a timer that measures the scroll operation time described above and proceeds to step S2. If the web browser determines that the scroll operation is not started (step S1: NO), the web browser proceeds to step S7.

In step S2, the web browser of the user terminal 1 performs a scroll process for scrolling the web page displayed in the window screen according to the scroll operation described above.

Next, the web browser of the user terminal 1 determines whether or not the scroll operation is ended on the basis of the operation signal caused by the scroll operation from the operation unit (step 3). If the scroll operation is absent for a predetermined time period (for example, 0.5 sec) (if the operation signal caused by the scroll operation is not transmitted from the operation unit for the predetermined time period), the web browser of the user terminal 1 determines that the scroll operation is ended (step S3: YES), stops counting of the timer that measures the scroll operation time described above, and proceeds to step S4. On the other hand, if the web browser of the user terminal 1 determines that the scroll operation is not ended (step S3: NO), the web browser returns to step S2 and continues the scroll process.

In step S4, the web browser of the user terminal 1 performs a process for obtaining the scroll operation information related to the scroll when the web page scrolls according to the scroll operation. Specifically, the web browser of the user terminal 1 calculates the amount of change of the web page that changes in the window screen and detects (calculates) the scroll operation speed by dividing the amount of change by the measured scroll operation time described above.

Next, the web browser of the user terminal 1 obtains the page ID of the scrolled web page, the site ID of the website 3k that provides the web page, and the object ID of the display object displayed in the window screen when the web page is scrolled (step S5).

Next, the web browser of the user terminal 1 creates the operation information file including the scroll operation information, the site ID, the page ID, and the object ID, which are obtained as described above (step S6), and temporarily stores the operation information file in the RAM.

In step S7, the web browser of the user terminal 1 determines whether or not the condition of transmission timing of the operation information file is satisfied. For example, when "a timing at which an scroll operation for performing a scroll from which the scroll operation information is obtained is ended" is defined as the transmission timing, if the condition of the transmission timing is satisfied (step S7: YES), the web browser proceeds to step S8, and if the condition of the transmission timing is not satisfied (step S7: NO), the web browser proceeds to step S9.

In step S8, the web browser of the user terminal 1 transmits the operation information file created in step S6 and the user ID stored in advance to the information providing server 2 via the network NW.

As the transmission timing described above, "a timing at which a scroll operation for performing the next scroll is started after the scroll from which the scroll operation information is obtained is ended" may be defined. In this case, when a scroll operation for performing the next scroll is started after the scroll from which the scroll operation information is obtained is ended, the operation information file created in step S6 and the like are transmitted to the information providing server 2.

Alternatively, as the transmission timing described above, "a timing at which the user performs a specification (or selection) operation other than the scroll operation after the scroll from which the scroll operation information is obtained is ended" may be defined. In this case, when the user performs a specification (or selection) operation other than the scroll operation after the scroll from which the scroll operation information is obtained is ended, the operation information file created in step S6 and the like are transmitted to the information providing server 2. Here, the specification (or selection) operation other than the scroll operation by the user include, for example, specification operations (clicking by a mouse) by various buttons such as a purchase button, a reservation button, and a settlement button and a specification operation for specifying a link to jump to another web page.

Alternatively, as the transmission timing described above, "a timing at which a predetermined time period has elapsed since the last transmission of the operation information file" may be defined. In this case, the operation information file created in step S6 and the like are transmitted to the information providing server 2 every predetermined time period (for example, every 1 minute).

Alternatively, as the transmission timing described above, "a timing at which a predetermined amount of data accumulation is detected" may be defined. In this case, the operation information file created in step S6 and the like are transmitted to the information providing server 2 every time the predetermined amount of data of the operation information file is accumulated. In step S9, the web browser of the user terminal 1 determines whether or not there is an instruction for ending the display of the web page. For example, when the close button (or the return button) of the web page is selected by the user, or when a hyperlink to jump to another web page is selected by the user, the web browser of the user terminal 1 determines that there is an instruction for ending the display of the web page (step S9: YES) and proceeds to step S11. On the other hand, if the web browser of the user terminal 1 determines that there is no instruction for ending the display of the web page (step S9: NO), the web browser proceeds to step S10, performs other processes (for example, a process according to an input operation by the user), and returns to step S1.

In step S11, the web browser of the user terminal 1 calculates the page-staying time, creates an operation information file including information indicating the page-staying time, the page ID, and the site ID, and transmits the created operation information file and the user ID stored in advance to the information providing server 2 via the network NW, and then completes the process.

The "scroll operation time" used in step S4 described above was defined as a time period from when the scroll operation is started to when the scroll operation is ended. However, when the scroll operation speed is calculated using this time period, if the user performs a scroll operation in which the user quickly scrolls the web page, temporarily stops the scroll operation, thoroughly browses the web page, and scrolls the web page again, it may not be possible to determine an appropriate user's degree of interest.

Therefore, considering such this case, if the "scroll operation time" is defined as a time period from when the scroll operation is started to when the next scroll operation is started, even when the user performs an scroll operation in which the user quickly scrolls the web page, temporarily stops the scroll operation, thoroughly browses the web page, and scrolls the web page again, it is possible to determine an appropriate user's degree of interest. Here, the time period from when the scroll operation is started to when the next scroll operation is started is specifically a time period from when a scroll operation for performing a scroll from which the scroll operation information is obtained is started to when a scroll operation for performing the next scroll is started after a time period in which the scroll is temporarily stopped. In this case, when the web browser of the user terminal 1 determines that the scroll operation is ended in step S3 described above, the web browser does not stop counting of the timer that measures the scroll operation time described above, and stops counting of the timer when the next scroll operation is started. In step S4, the web browser of the user terminal 1 calculates the scroll operation speed by dividing the amount of change of the web page that changes in the window screen by the measured scroll operation time described above (the time period from when the scroll operation is started to when the next scroll operation is started). In this case, in step S8, when a scroll operation for performing the next scroll is started after the scroll from which the scroll operation information is obtained is ended, the web browser of the user terminal 1 transmits the operation information file including the calculated scroll operation speed and the like to the information providing server 2.

FIG. 5 is a conceptual diagram showing an example of a relationship between the amount of change of the web page and the scroll operation time. In a time period P1 shown in FIG. 5, "t1" is a time period in which the web page scrolls (that is, a time period from when the scroll operation is started to when the scroll operation is ended), "t2" is a time period in which the scroll is temporarily stopped, and "t3" (=t1+t2) is a time period from when the scroll operation is started to when the next scroll operation is started. In the time period P1 shown in FIG. 5, "d1" is the amount of change by the scroll.

When "t1" is used as the scroll operation time described above, the scroll operation speed is calculated as v1=d1/t1. On the other hand, when "t3" is used as the scroll operation time described above, the scroll operation speed is calculated as v3=d1/t3. In this way, in the time period P1, if the scroll operation speed is calculated by using "t1" as the scroll operation time, the scroll operation speed becomes relatively high, so that it is determined that the user's degree of interest is low. On the other hand, if the scroll operation speed is calculated by using "t3", which includes the time while the scroll is temporarily stopped, as the scroll operation time, the scroll operation speed becomes relatively low, so that it is determined that the user's degree of interest is high.

If the scroll operation time is defined as "a time period from when the scroll operation is started to when the next scroll operation is started", in a time period P4 shown in FIG. 5, the scroll operation time and the scroll operation speed are not calculated because the next scroll operation is not started (because, for example, the display of the web page is ended) in the time period P4. When the scroll operation speed_average value is calculated, only the three scroll operation speeds in the time periods P1 to P3 are used and the time period P4 is not considered.

In the process shown in FIG. 4, the operation information file is transmitted to the information providing server 2 every time a scroll is performed while the web page is displayed. However, as another example, it may be configured so that the created operation information files are stored in the storage unit (hard disk or the like) and the stored operation information files and the user ID are transmitted to the information providing server 2 every time the user terminal 1 sends a login request to the information providing server 2.

The operation information file described above may be configured to store information related to the website 3A and information related to the web page provided from the website 3A.

Although, in the operation example described above, the website 3A is used as an example, the other websites 3k can be used in the same manner as the website 3A.

(3.2. Registration of Scroll Operation Information and the Like)

Next, a registration process of the scroll operation information and the like by the information providing server 2 will be described with reference to FIG. 6.

FIG. 6 is a flowchart showing the registration process of the scroll operation information and the like in the system control unit 24 of the information providing server 2. The process shown in FIG. 6 is started when the operation information file and the user ID transmitted from the user terminal 1 are received.

When the process shown in FIG. 6 is started, the system control unit 24 of the information providing server 2 obtains the scroll operation information, the site ID, the page ID, and the object ID from the received operation information file (step S21).

Next, the system control unit 24 registers the obtained scroll operation information, site ID, page ID, and object ID in the operation information database 224 in association with the received user ID (step S22) and completes the process.

It may be configured so that, when the same combination of page ID and object ID as the combination of the obtained page ID and object ID has been already registered in the operation information database 224 in association with the user ID, the obtained scroll operation information, site ID, page ID, and object ID are discarded without being registered, or the obtained scroll operation information, site ID, page ID, and object ID are registered instead of (overwritten on) the already registered scroll operation information, site ID, page ID, and object ID.

When information related to the web page is stored in the operation information file, the information related to the web page and the page ID are associated with each other and stored in the site information database 223. When information related to the display object is stored in the operation information file, the information related to the display object and the object ID are associated with each other and stored in the site information database 223.

By the way, although, in the above example, the user terminal 1 is configured to calculate the scroll operation speed, the information providing server 2 may be configured to calculate the scroll operation speed. In this case, "the amount of change of the web page" and "the scroll operation time" ("the time period from when the scroll operation is started to when the scroll operation is ended" or "the time period from when the scroll operation is started to when the next scroll operation is started") calculated by the user terminal 1 are included in the operation information file and transmitted to the information providing server 2. Then the scroll operation speed is calculated from "the amount of change of the web page" and "the scroll operation time" by the system control unit 24 and registered in the operation information database 224.

The process shown in FIG. 6 is also performed when the operation information file including the information indicating the page-staying time, the page ID, and the site ID and user ID are received from the user terminal 1.

(3.3. Information Providing Based on the Degree of Interest)

Next, an information providing process based on the degree of interest by the information providing server 2 will be described with reference to FIG. 7.

FIG. 7 is a flowchart showing the information providing process based on the degree of interest in the system control unit 24 of the information providing server 2. As a precondition of this process, it is assumed that user information of the user of the user terminal 1 has already been registered in the user information database 221 and authentication information of the user has already been registered in the authentication information database 222 by a member registration process.

The process shown in FIG. 7 is started when a login process is performed according to a login request (including a login ID and a password) from the user terminal 1 that accesses the information providing server 2 and the user ID of the user terminal 1 is identified in the information providing server 2. In the login process, it is determined whether or not the combination of the login ID and the password included in the login request is registered in the authentication information database 222, and if the combination is registered, the user ID is identified.

When the process shown in FIG. 7 is started, the system control unit 24 of the information providing server 2 determines whether the system control unit 24 calculates the degree of interest in an object or the degree of interest in a page (step S31). Which one between the degree of interest in an object and the degree of interest in a page is calculated may be set in advance by an administrator or may be selected by the user of the user terminal 1.

If the system control unit 24 determines that the degree of interest in an object is calculated, the system control unit 24 proceeds to step S32, and if the system control unit 24 determines that the degree of interest in a page is calculated, the system control unit 24 proceeds to step S36.

In step S32, the system control unit 24 extracts the object ID associated with the above-identified user ID and the scroll operation information associated with the object ID from the operation information database 224.

Next, on the basis of the scroll operation information associated with each object ID extracted as described above, the system control unit 24 calculates the user's degree of interest in an object for the display object identified by the object ID for each display object as described above (step S33).

Next, the system control unit 24 registers each calculated degree of interest in an object in the degree-of-interest information database 225 in association with the object ID of the corresponding display object and the above-identified user ID (step S34).

Next, the system control unit 24 extracts all (or a predetermined number of) the object IDs associated with the identified user ID and the degrees of interest in an object associated with the object IDs from the degree-of-interest information database 225, determines the ranking of the degree of interest in an object on the basis of the extracted degrees of interest in an object (step S35), and proceeds to step S40. In the ranking of the degree of interest in an object, for example, the object IDs are arranged in descending order of the degree of interest in an object and a rank of the degree of interest in an object is given to each display object.

On the other hand, in step S36, the system control unit 24 extracts the page ID associated with the identified user ID and the scroll operation information associated with the page ID from the operation information database 224.

Next, on the basis of the scroll operation information associated with each page ID extracted as described above, the system control unit 24 calculates the user's degree of interest in a page for the web page identified by the page ID for each web page as described above (step S37).

Next, the system control unit 24 registers each calculated degree of interest in a page in the degree-of-interest information database 225 in association with the page ID of the corresponding web page and the above-identified user ID (step S38).

Next, the system control unit 24 extracts all (or a predetermined number of) the page IDs associated with the identified user ID and the degrees of interest in a page associated with the page IDs from the degree-of-interest information database 225, determines the ranking of the degree of interest in a page on the basis of the extracted degrees of interest in a page (step S39), and proceeds to step S40. In the ranking of the degree of interest in a page, for example, the page IDs are arranged in descending order of the degree of interest in a page and a rank of the degree of interest in a page is given to each web page.

Then, in step S40, the system control unit 24 selects advertisement information related to a product or a service to be recommended to the user from the advertisement information database 226 on the basis of the determined ranking of the degree of interest in an object (or the degree of interest in a page). For example, the system control unit 24 identifies a category or a product type of the display object at the top of the ranking of the degree of interest in an object from the site information database 223 and selects advertisement information to which the identified category or product type is added from the advertisement information database 226.

It may be configured so that advertisement information is registered in the advertisement information database 226 for each web page or display object and any one of the advertisement information is selected (sorted and taken out) on the basis of the degree of interest described above. In this case, for example, advertisement information, to which a category or a product type (or a service type) of the display object at the top of the ranking of the degree of interest in an object is added, is selected.

Next, the system control unit 24 generates a web page in which the selected advertisement information is displayed and transmits the generated web page to the user terminal 1 (step S41). The transmitted web page is displayed on the display of the user terminal 1. In this way, it is possible to recommend a product (or a service) to the user for each category or for each product (or for each service) on the basis of the degree of interest.

It may be configured so that, to generate the web page, a plurality of material data that form a layout different from a basic layout of the web page are registered in advance, one of the material data (for example, material data to which a category of the display object at the top of the ranking of the degree of interest in an object is added) is selected on the basis of the degree of interest, and a layout formed by the selected material data is determined. According to this configuration, a web page whose layout is preferred by the user is automatically provided.

Although, in step S40 described above, it is configured so that advertisement information related to a product or a service to be recommended to the user is selected on the basis of the ranking of the degree of interest in an object or the ranking of the degree of interest in a page, it may be configured so that advertisement information related to a product or a service to be recommended to the user is selected on the basis of both the ranking of the degree of interest in an object and the ranking of the degree of interest in a page. For example, the system control unit 24 selects advertisement information, to which a category or a product type of the display object at the top of the ranking of the degree of interest in an object is given and to which a category of the web page at the top of the ranking of the degree of interest in a page is given, from the advertisement information database 226. According to this configuration, a product or a service, in which the user seems to be highly interested, can be recommended to the user.

Although it is configured so that the degree of interest in an object and the degree of interest in a page are calculated and registered in the degree-of-interest information database 225 when the user ID is identified by a login process, as another example, it may be configured so that the degree of interest in an object and the degree of interest in a page are calculated and registered in the degree-of-interest information database 225 every predetermined time period (for example, every 12 hours) regardless of the login process. According to this configuration, a web page in which the selected advertisement information is displayed can be more quickly generated and transmitted.

As described above, according to the embodiment, the information providing server 2 is configured to obtain the scroll operation information related to a scroll when a web page displayed on the user terminal 1 scrolls according to a scroll operation of the user and determine the user's degree of interest in the web page or the display object on the basis of the scroll operation information, so that it is possible to improve the accuracy of the user's degree of interest in the web page or the display object and appropriately evaluate the degree of interest. Further, it is possible to present advertisement information and the like more suited to the preference of the user and recommend a product or a service more effectively by using such a highly accurate user's degree of interest.

In particular, the height of the degree of interest is determined by the speed of the scroll operation by the user, so that it is possible to determine a highly accurate degree of interest during a normal scroll operation while the user is unaware.

The degree of interest is determined for each of the page and the object, so that it is possible to use the degree of interest according to a purpose of use. For example, when the degree of interest in an object is hoped to be used, it is possible to know more detailed user's degree of interest.

[4. Adjustment of the Degree of Interest by the Size of Screen]

In the above-described embodiment, the information providing server 2 may be configured to adjust the degree of interest by weighting the degree of interest according to the screen size of the web browser of the user terminal 1 when calculating the degree of interest on the basis of the scroll operation information.

In this case, the web browser of the user terminal 1 creates the operation information file, which includes screen size information indicating the screen size in addition to the scroll operation information, the site ID, the page ID, and the object ID, and transmits the operation information file and the user ID to the information providing server 2. The screen size of the web browser can be obtained by JavaScript (registered trademark).

When the system control unit 24 of the information providing server 2 receives the operation information file from the user terminal 1, the system control unit 24 obtains the scroll operation information, the site ID, the page ID, the object ID, and the screen size information from the operation information file and registers the scroll operation information, the site ID, the page ID, the object ID, and the screen size information in the operation information database 224 in association with the user ID.

When the system control unit 24 of the information providing server 2 extracts the scroll operation information, the page ID, the object ID, and the screen size information which are associated with the user ID from the operation information database 224 and calculates the degree of interest on the basis of the extracted scroll operation information, the system control unit 24 adjusts the degree of interest by weighting the degree of interest according to the screen size indicated in the extracted screen size information.

For example, when calculating the degree of interest by the calculation formula of Sc (degree of interest)=$\alpha$ (arbitrary coefficient)/v (scroll operation speed), if the screen size is larger than (for example, if the area is larger than) a predetermined reference screen size (for example, 800 dots horizontally×600 dots vertically), the degree of interest is adjusted by decreasing a weight $\alpha$ to be smaller than "$\alpha$" (for example "$\alpha$"=100) used when the screen size is the same as the reference screen size (for example, $\alpha$ is decreased to 80). This is because, when the screen size is larger than the reference screen size, it takes time to know the contents of the web page and the scroll operation speed tends to be slow (that is, the degree of interest increases even though the user is not so much interested in the web page), so that the degree of interest is decreased accordingly.

On the other hand, if the screen size is smaller than (for example, if the area is smaller than) the predetermined reference screen size, the degree of interest is adjusted by increasing the weight $\alpha$ to be greater than "$\alpha$" (for example "$\alpha$"=100) used when the screen size is the same as the reference screen size (for example, $\alpha$ is increased to 120). This is because, when the screen size is smaller than the reference screen size, the contents of the web page can be quickly known and the scroll operation speed tends to be fast (that is, the degree of interest decreases even though the user is interested in the web page), so that the degree of interest is increased accordingly.

According to the above configuration, for example, even when one user uses a user terminal whose screen size is large (for example, PC) and a user terminal whose screen size is small (for example, PDA), the degrees of interest calculated by using the scroll operation speeds and the like detected in each user terminal can be used in common.

[5. Adjustment of the Degree of Interest by the Displayed Character Size]

In the above-described embodiment, the information providing server 2 may be configured to adjust the degree of interest by weighting the degree of interest according to the displayed character size in the web page or the display object displayed on the user terminal 1 when calculating the degree of interest on the basis of the scroll operation information.

In this case, the web browser of the user terminal 1 creates the operation information file, which includes displayed character size information indicating the displayed character size in addition to the scroll operation information, the site ID, the page ID, and the object ID, and transmits the operation information file and the user ID to the information providing server 2.

When the system control unit 24 of the information providing server 2 receives the operation information file from the user terminal 1, the system control unit 24 obtains the scroll operation information, the site ID, the page ID, the object ID, and the displayed character size information from the operation information file and registers the scroll operation information, the site ID, the page ID, the object ID, and the displayed character size information in the operation information database 224 in association with the user ID.

When the system control unit 24 of the information providing server 2 extracts the scroll operation information, the page ID, the object ID, and the displayed character size information which are associated with the user ID from the operation information database 224 and calculates the degree of interest on the basis of the extracted scroll operation information, the system control unit 24 adjusts the degree of interest by weighting the degree of interest according to the displayed character size indicated in the extracted displayed character size information.

For example, when calculating the degree of interest by the calculation formula of Sc (degree of interest)=α (arbitrary coefficient)/v (scroll operation speed), if the displayed character size is smaller than a predetermined reference character size (for example, medium), the degree of interest is adjusted by decreasing the weight α to be smaller than "α" (for example "α"=100) used when the displayed character size is the same as the reference character size (for example, α is decreased to 80). This is because, when the displayed character size is smaller than the reference character size, it takes time to know the contents of the web page and the scroll operation speed tends to be slow (that is, the degree of interest increases even though the user is not so much interested in the web page), so that the degree of interest is decreased accordingly.

On the other hand, if the displayed character size is larger than the predetermined reference character size, the degree of interest is adjusted by increasing the weight α to be greater than "α" (for example "α"=100) used when the displayed character size is the same as the reference character size (for example, α is increased to 120). This is because, when the displayed character size is larger than the reference character size, the contents of the web page can be quickly known and the scroll operation speed tends to be fast (that is, the degree of interest decreases even though the user is interested in the web page), so that the degree of interest is increased accordingly.

According to the above configuration, for example, even when one user uses a user terminal in which the displayed character size is large (for example, PC) and a user terminal in which the displayed character size is small (for example, PDA), the degrees of interest calculated by using the scroll operation speeds detected in each user terminal can be used in common. Even when one user uses one user terminal and the user arbitrarily changes the displayed character size, the degrees of interest calculated by using the scroll operation speeds detected each time the web page is displayed using a different character size can be used in common.

It may be configured so that the degree of interest is adjusted by a parameter other than the screen size and the displayed character size described above. For example, it may be configured so that the degree of interest is adjusted by the type of the display object (for example, moving image and still image). This is because a user views a moving image by temporarily stopping the scroll operation or slowing the scroll speed at the moving image differently from viewing a still image, so that the time for this operation needs to be considered. In this case, for example, if the display object being scrolled is a moving image, the degree of interest is adjusted by decreasing the weight α to be smaller than "α" (for example "α"=100) used when the display object is a still image (for example, α is decreased to 50) (that is, the degree of interest is decreased).

Although, in the embodiment described above, an example in which the system control unit 24 of the information providing server 2 has functions as the information obtaining means and the degree of interest calculation means of the present invention is described, for example, a terminal program that causes a computer to function as these means may be plugged in to the web browser of the user terminal 1. In this case, the user terminal 1 obtains the scroll operation information of the display area of the contents displayed on the window screen and the contents identification information for identifying the contents and calculates the user's degree of interest in the contents identified by the obtained contents identification information on the basis of the obtained scroll operation information (the above process may be performed by transmitting the calculated result to the information providing server 2). For example, the terminal program of the present invention may be obtained from a predetermined server or the like via the network NW or may be stored in a recording medium such as a CD or a DVD and read via a drive apparatus.

DESCRIPTION OF REFERENCE NUMERALS

1 User terminal
2 Information providing server
3k Website
21 Communication unit
22 Storage unit
23 Input/output interface unit
24 System control unit
25 System bus
NW Network
S Information providing system

The invention claimed is:

1. A server apparatus which is accessible from a terminal apparatus via a network, the server apparatus comprising:
   at least one memory configured to store computer program code;
   and at least one processor configured to read said program code and operate as instructed by said program code including:
      information obtaining code configured to obtain scroll operation information of a display area of the terminal apparatus, contents identification information for identifying contents displayed in the display area from the terminal apparatus, and displayed character size information indicating a displayed character size in the contents displayed on the terminal apparatus;
      degree of interest calculation code configured to calculate a user's degree of interest in the contents identified by the obtained contents identification information on the basis of the obtained scroll operation information, wherein, after the degree of interest calculation code calculates the degree of interest on the basis of the scroll operation information, the degree of interest calculation code further adjusts the calculated degree of interest by weighting the calculated degree of interest according to the displayed character size information as one of parameters having an influence on a time for which the user knows the details of the contents, and wherein, the weighting the calculated degree of interest comprises adjusting an arbitrary coefficient for calculating the degree of interest based on comparison of the obtained displayed character size information with a predetermined reference displayed character size; and information selection code configured to select specific information based on the adjusted degree of interest, and provide the selected specific information to the user terminal for display to the user.

2. The server apparatus of claim 1, wherein the information selection code is further configured to select the specific information based on a ranking of the adjusted degree of interest.

\* \* \* \* \*